United States Patent
Asakura

(10) Patent No.: US 10,556,589 B2
(45) Date of Patent: Feb. 11, 2020

(54) VEHICLE CONTROL SYSTEM, VEHICLE CONTROL METHOD AND VEHICLE CONTROL PROGRAM

(71) Applicant: Honda Motor Co., Ltd., Tokyo (JP)

(72) Inventor: Masahiko Asakura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 235 days.

(21) Appl. No.: 15/488,528

(22) Filed: Apr. 17, 2017

(65) Prior Publication Data

US 2017/0313313 A1 Nov. 2, 2017

(30) Foreign Application Priority Data

Apr. 28, 2016 (JP) ................................. 2016-091903

(51) Int. Cl.
| | | |
|---|---|---|
| *B60W 30/18* | (2012.01) | |
| *B60W 30/12* | (2006.01) | |
| *B60W 50/14* | (2012.01) | |
| *B60W 30/16* | (2012.01) | |
| *B60W 50/00* | (2006.01) | |

(52) U.S. Cl.
CPC ...... *B60W 30/18009* (2013.01); *B60W 30/12* (2013.01); *B60W 30/16* (2013.01); *B60W 50/0098* (2013.01); *B60W 50/14* (2013.01); *B60W 2050/0095* (2013.01); *B60W 2050/146* (2013.01); *B60W 2420/42* (2013.01); *B60W 2420/52* (2013.01); *B60W 2510/20* (2013.01); *B60W 2510/244* (2013.01); *B60W 2510/305* (2013.01); *B60W 2540/10* (2013.01); *B60W 2540/12* (2013.01); *B60W 2540/18* (2013.01); *B60W 2550/402* (2013.01); *B60W 2710/18* (2013.01); *Y02T 10/7258* (2013.01)

(58) Field of Classification Search
CPC ........... B60W 30/18009; B60W 30/12; B60W 30/16; B60W 50/0098; B60W 50/14; B60W 2050/0095; Y02T 10/7258
USPC .......................................................... 701/23
See application file for complete search history.

(56) References Cited

U.S. PATENT DOCUMENTS

| 2016/0039411 A1* | 2/2016 | Park .................... G01S 13/87 |
| | | 701/70 |
| 2016/0207414 A1* | 7/2016 | Watanabe ............... B60L 1/003 |

FOREIGN PATENT DOCUMENTS

| JP | 2003262525 | 9/2003 |
| JP | 2008152391 | 7/2008 |
| JP | 2011-075382 | 4/2011 |

(Continued)

OTHER PUBLICATIONS

"Office Action of Japan Counterpart Application," with partial English translation thereof, dated Aug. 29, 2017, p. 1-p. 24, in which the listed references were cited.

*Primary Examiner* — Nadeem Odeh
(74) *Attorney, Agent, or Firm* — JCIPRNET

(57) ABSTRACT

One of objectives of the present invention is to provide a vehicle control system, a vehicle control method and a vehicle control program, which can properly perform control related to automatic driving based on the energy of the vehicle. The vehicle control system comprises: an automatic driving control part, executing automatic driving performing automatic driving of at least one of velocity control and steering control of an automatic vehicle, and a function limiting part, limiting functions related to automatic driving when the energy of the vehicle is insufficient due to automatic driving.

10 Claims, 12 Drawing Sheets

(56) References Cited

FOREIGN PATENT DOCUMENTS

JP          2015056948          3/2015
WO     WO-2015037209 A1 *   3/2015   .............. B60L 1/003

* cited by examiner

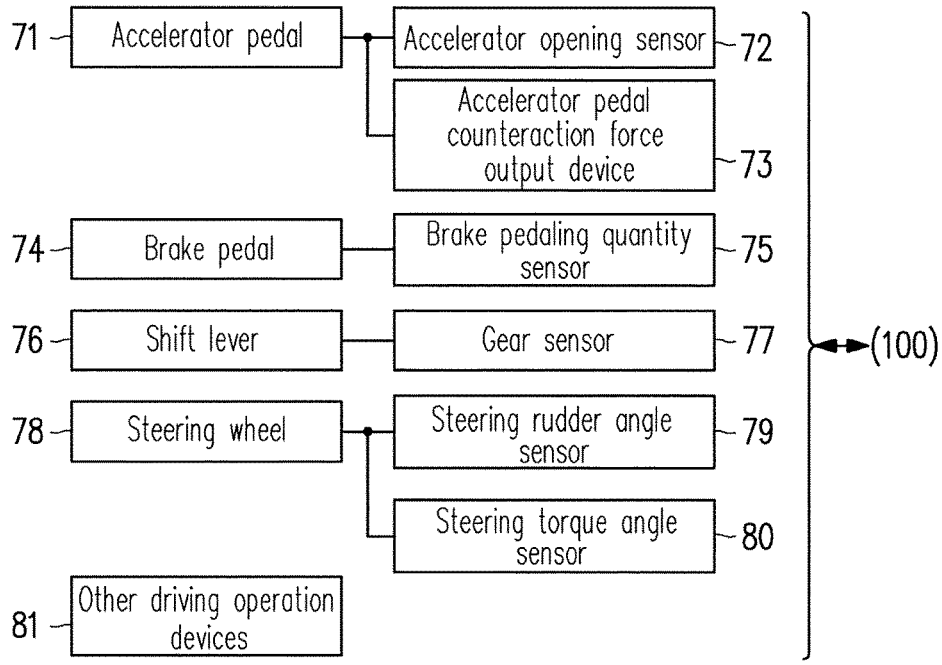
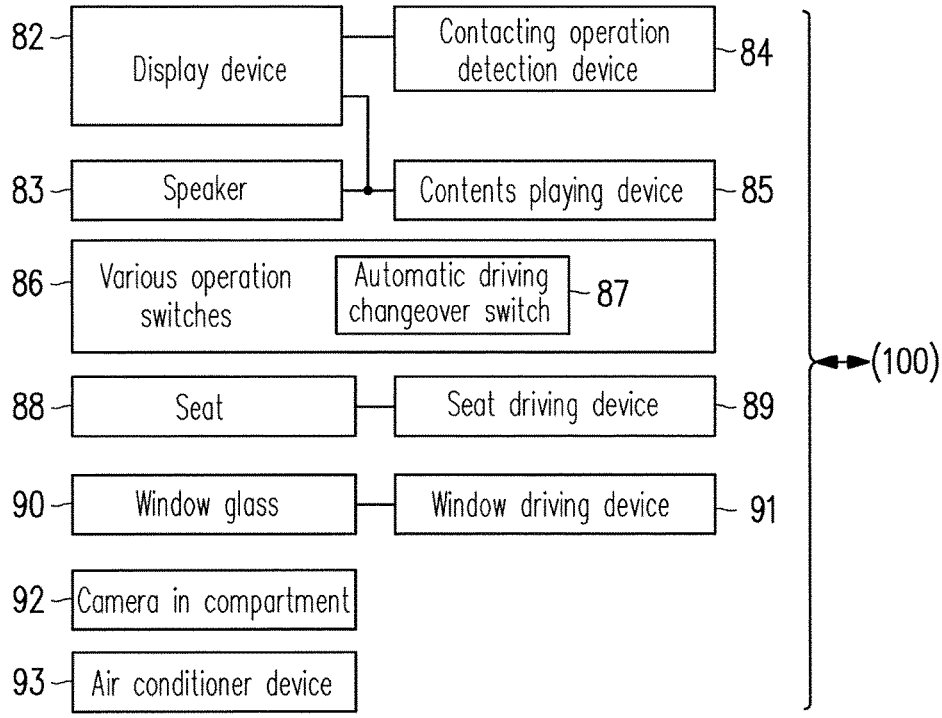
FIG. 3

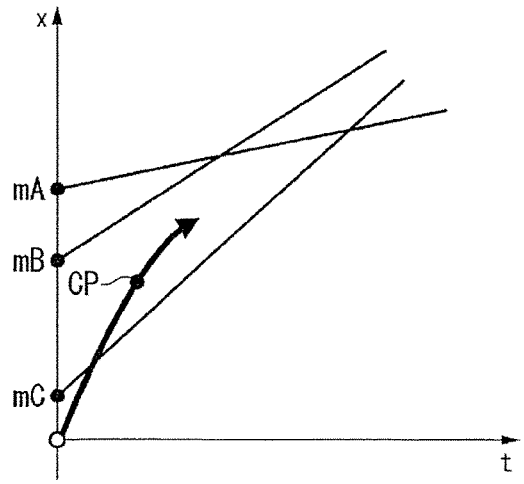
FIG. 10
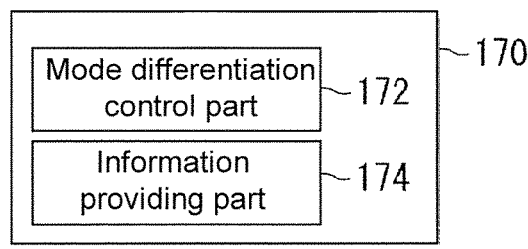
FIG. 11
185
| Driving mode<br>Non-driving<br>operation system | Manual<br>driving<br>mode | Automatic driving mode | | | ... |
| --- | --- | --- | --- | --- | --- |
| | | Mode A | Mode B | Mode C | |
| Navigation operation | NO | YES | YES | NO | ... |
| Contents playing operation | NO | YES | NO | NO | ... |
| Instrument panel operation | NO | YES | YES | YES | ... |
| ... | ... | ... | ... | ... | ... |
FIG. 12

190

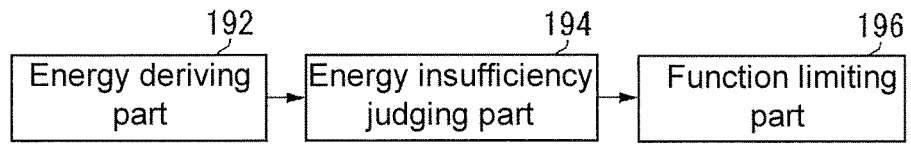

| Periphery monitoring device | Limiting mode | | | ... |
| --- | --- | --- | --- | --- |
| | Limitation 1 | Limitation 2 | Limitation 3 | |
| Finder (front) | Monitoring | Monitoring | Stopping | ... |
| Finder (right) | Monitoring | Stopping | Stopping | ... |
| Finder (left) | Monitoring | Stopping | Stopping | ... |
| Finder (rear) | Stopping | Stopping | Stopping | ... |
| Radar (front) | Monitoring | Monitoring | Stopping | ... |
| Radar (right) | Monitoring | Stopping | Stopping | ... |
| Radar (left) | Monitoring | Stopping | Stopping | ... |
| Radar (rear) | Stopping | Stopping | Stopping | ... |
| Camera | Monitoring | Monitoring | Monitoring | ... |
| ... | ... | ... | ... | ... |

FIG. 14

VEHICLE CONTROL SYSTEM, VEHICLE CONTROL METHOD AND VEHICLE CONTROL PROGRAM

CROSS-REFERENCE TO RELATED APPLICATION

This application claims the priority benefit of Japan application serial no. 2016-091903, filed on Apr. 28, 2016. The entirety of the above-mentioned patent application is hereby incorporated by reference herein and made a part of this specification.

BACKGROUND OF THE INVENTION

1. Field of the Invention

The present invention relates to a vehicle control system, a vehicle control method and a vehicle control program.

2. Description of Related Art

In recent years, research on at least one of technologies (called as automatic driving hereinafter) in velocity control and steering control of automatic vehicles is being promoted. Relatively, there is a known navigation device, characterized by calculating a consumption of driving energy during driving on any link contained in map information, and calculating a recommended path in the paths of which a residual of the driving energy of the vehicles is not lower than a prescribed threshold value and having a least cost based on the residual of the driving energy and the residual of the driving energy of the vehicles (for example with reference to patent document 1).

Existing Technical Documents

Patent Document

Patent document 1: Japanese Patent No. 2011-075382

SUMMARY OF THE INVENTION

Problem to be Solved by the Invention

But, under the condition of insufficient energy of the vehicles caused by energy consumption due to automatic driving, the control on the automatic driving is not considered sometimes.

The present invention is finished in consideration of this situation, and one of its objectives is to provide a vehicle control system, a vehicle control method and a vehicle control program, which can properly perform control related to automatic driving based on energy of the vehicles.

Technical Means Solving the Problem

The invention according to claim 1 is a vehicle control system (100), comprising an automatic driving control part (120), performing automatic driving of at least one of velocity control and steering control of an automatic vehicle, and a function limiting part, limiting functions related to automatic driving when the energy of a vehicle is insufficient due to automatic driving.

The invention of claim 2 is the vehicle control system according to claim 1, wherein the function limiting part limits the functions related to automatic driving specific to each control direction viewed from the vehicle in the automatic driving.

The invention of claim 3 is the vehicle control system according to claim 1 or 2, wherein the function limiting part causes the control based on a front side condition of the vehicle to be on priority while limiting the functions related to automatic driving along with insufficiency of the energy.

The invention of claim 4 is the vehicle control system according to any one of claims 1-3, wherein the function limiting part stops each function related to automatic driving based on the energy of each function related to the automatic driving.

The invention of claim 5 is the vehicle control system according to any one of claims 1-4, wherein the function limiting part limits a monitored object range of a periphery monitoring device used by the automatic driving when the energy of the vehicle is insufficient.

The invention of claim 6 is the vehicle control system according to any one of claims 1-5, wherein the function limiting part forbids lane change of the automatic driving on the vehicle when the energy of the vehicle is insufficient.

The invention of claim 7 is the vehicle control system according to any one of claims 1-6, wherein the function limiting part forbids one or two of forking and converging of the automatic driving on the vehicle when the energy of the vehicle is insufficient.

The invention of claim 8 is the vehicle control system according to any one of claims 1-7, which further comprises an energy deriving part (192), deriving the energy predicted to be consumed based on an action plan or path condition in a traveling path when the vehicle drives on the traveling path from a current position of the vehicle to a destination, and the function limiting part limits the functions related to the automatic driving based on the energy to be consumed derived by the energy deriving part.

The invention of claim 9 is a vehicle control method, by which a computer performs automatic driving of at least one of velocity control and steering control of an automatic vehicle, and limits functions related to automatic driving when the energy of the vehicle is insufficient due to automatic driving.

The invention of claim 10 is a vehicle control program, enabling a computer to to perform automatic driving of at least one of velocity control and steering control of an automatic vehicle, and limit functions related to automatic driving when the energy of the vehicle is insufficient due to automatic driving.

Effects of the Invention

The invention according to claim 1, claim 6, claim 7, claim 9 and claim 10 can properly perform control related to automatic driving based on energy of the vehicle.

The invention according to claim 2 and claim 3 can cause direction control with a high importance on priority in automatic driving, thereby ensuring safety in the automatic driving.

The invention according to claim 4, inhibition on more efficient energy can be realized.

The invention according to claim 5, the control related to automatic driving based on energy of the vehicle can be properly performed.

The invention according to claim 8, the insufficiency of energy of the vehicle can be detected with a better precision based on the energy predicted to be consumed and the energy of the vehicle.

BRIEF DESCRIPTION OF THE DRAWINGS

FIG. 3 is a structural diagram of HMI 70.

FIG. 10 is a diagram illustrating a velocity generating model when velocities of three peripheral vehicles are assumed to be fixed.

FIG. 11 is a diagram illustrating an example of a structure of an HMI control part 170.

FIG. 12 is a diagram illustrating an example of a mode differentiation operation yes/no information 185.

FIG. 13 is a diagram illustrating a structure of an energy control part 190.

FIG. 14 is a diagram illustrating an example of function limiting information 186.

DESCRIPTION OF THE EMBODIMENTS

Hereinafter, embodiments of the vehicle control system, the vehicle control method and the vehicle control program of the present invention are explained with reference to drawings.

Figure 1:
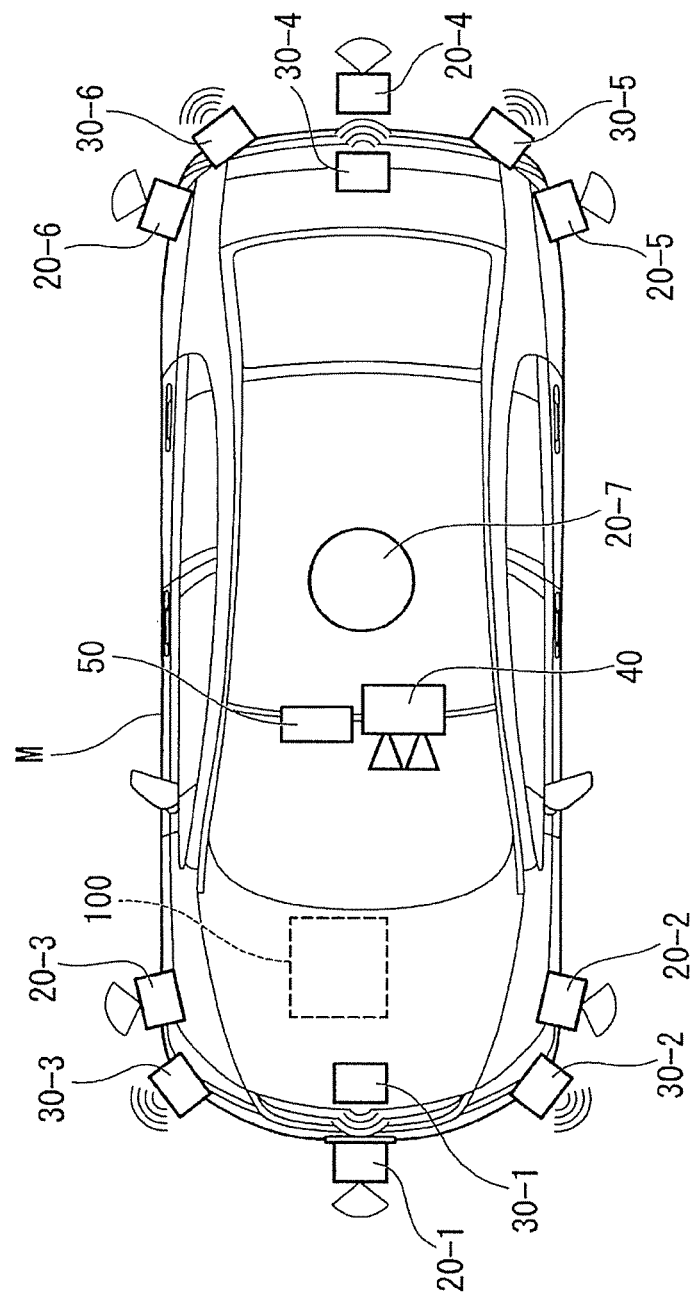
FIG. 1 is a diagram illustrating constitution elements of a vehicle carrying a vehicle control system 100 of respective embodiments.

FIG. 1 is a diagram of constitution elements of a vehicle (step Short for own vehicle M) carrying a vehicle control system 100 of respective embodiments. The vehicle carrying the vehicle control system 100 for example is a two-wheel, three-wheel or four-wheel vehicle, including a vehicle taking a diesel engine or gasoline engine as an internal combustion engine as power energy, an electric vehicle taking an electromotor as a power source, a hybrid vehicle having both the internal combustion engine and the electromotor, etc. The electric vehicle for example is driven by electricity released from a secondary battery, a hydrogen fuel battery, a metal fuel battery, an alcohol fuel battery, and other batteries.

As shown in FIG. 1, the own vehicle M carries sensors such as finders 20-1 to 20-7, radars 30-1 to 30-6, a camera 40, a navigation device 50 and a vehicle control system 100.

The finders 20-1 to 20-7 for example detect the scattering light relative to irradiating light, so as to detect a distance from LIDAR (Light Detection and Ranging) or Laser Imaging Detection and Ranging of a distance to an object. For example, the finder 20-1 is mounted on a front grill, etc., the finder 20-2 and finder 20-3 are mounted on a side surface or door mirror, inside a headlamp or nearby a side lamp, etc. The finder 20-4 is mounted on a trunk lid, etc., and the finder 20-5 and the finder 20-6 are mounted at the side surface of a vehicle body or inside a taillight, etc. The finders 20-1 to 20-6 for example have a detection region of about 150 degrees in the horizontal direction. Besides, the finder 20-7 is mounted on a vehicle roof, etc. The detector 20-7 for example has a detection region of 360 degrees in the horizontal direction.

The radar 30-1 and radar 30-4 for example are long distance millimetre wave radars of which the detection region in a depth direction is longer than other radars. Besides, the radars 30-2, 30-3, 30-5 and 30-6 are middle distance millimetre wave radars of which the detection region is shorter than the radars 30-1 and radar 30-4 in a depth direction.

Hereinafter, under the condition of not being particularly distinguished, the finders 20-1 and 20-7 are short for "finder 20", under the condition of not being particularly distinguished, the radars 30-1 to 30-6 are short for radar 30. The radar 30 for example detects an object in a Frequency Modulated Continuous Wave (FM-CW) manner.

The camera 40 for example uses a digital camera using a solid camera device such as a Charged Coupled Device (CCD) or Complementary Metal Oxide Semiconductor (CMOS). The camera 40 is mounted on the upper part of a front window at the front surface of a vehicle or on the back surface of a vehicle room mirror. The camera 40 for example periodically repeatedly photographs a position in front of the own vehicle M. The camera 40 can be also a stereo camera containing multiple cameras.

In addition, the structure as shown in FIG. 1 is only an example, that is, part of the constitution can be omitted or other structures can be further added.

Figure 2:
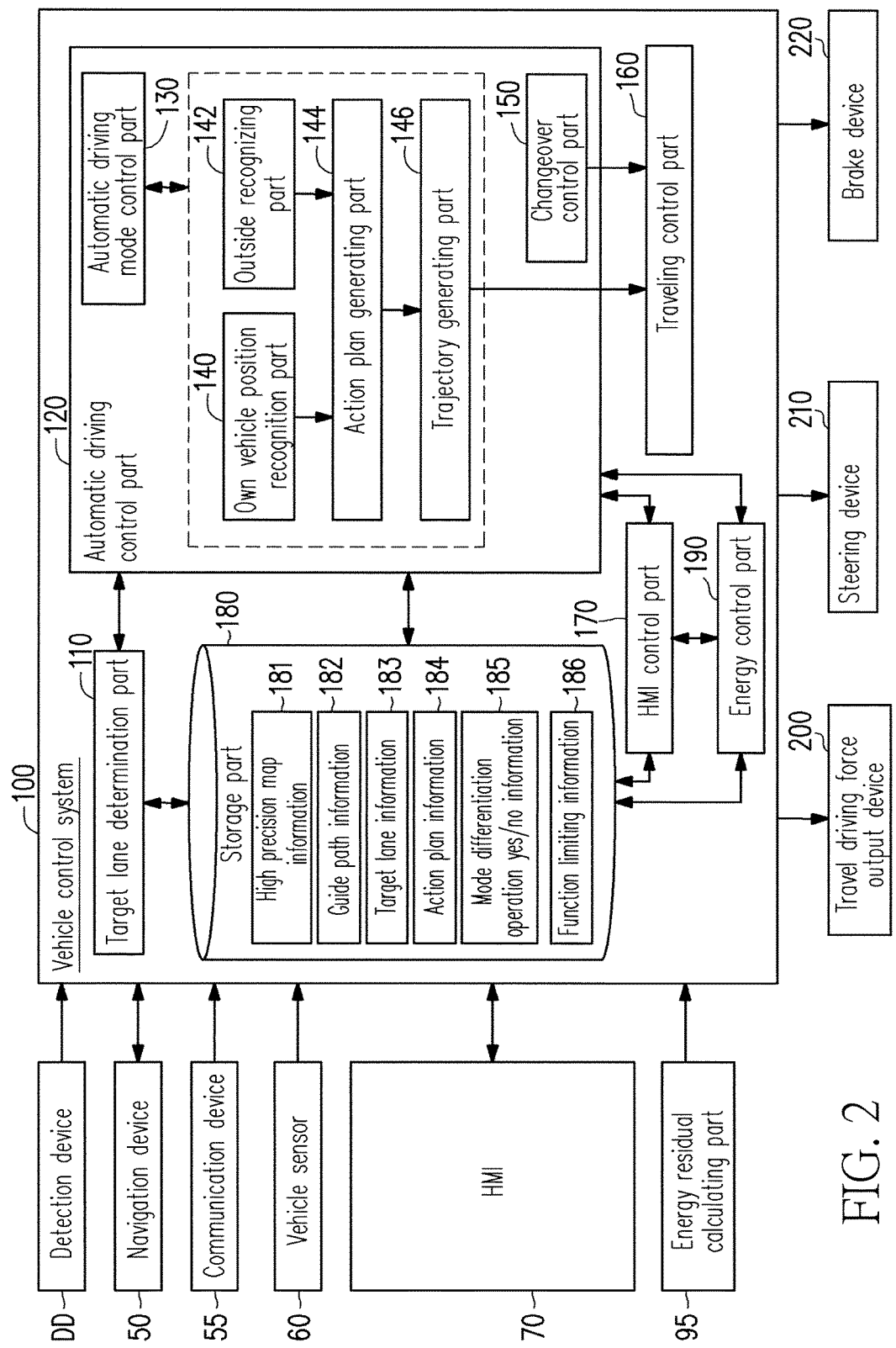
FIG. 2 is a function structural diagram taking a vehicle control system 100 as a center.

FIG. 2 is a function structure diagram taking the vehicle control system 100 of the embodiment as a center. The own vehicle M carries a detection device (periphery monitoring device) (DD) containing a finder 20, a radar 30, a camera 40, etc., a navigation device 50, a communication device 55, a vehicle sensor 60, a Human Machine Interface (HMI) 70, an energy residual calculating part 95, a vehicle control system 100, a travel driving force output device 200, a steering device 210 and a brake device 220. These devices or equipments are connected to one another by a multiplexing communication line such as a Controller Area Network (CAN), or a serial communication line, a wireless communication network, etc. In addition, the vehicle control system in claims is not only referred to "the vehicle control system 100", but also comprises the constitution (for example, finder DD, HMI 70, energy residue calculating part 95, etc.) except for "vehicle control system 100".

The navigation system 50 has a Global Navigation Satellite System (GNSS) receiver or map information (navigation map), and a touch panel display device playing a role as a user interface, a speaker, a microphone, etc. The navigation device 50 determines the position of the own vehicle M by the GNSS receiver, and derives a path (traveling path, guide path) for guiding the own vehicle M from such position to the destination designated by a vehicle passenger (passenger). Besides, the navigation device 50 can also derive a path from a position (for example, a nearest station, etc.) designated by the vehicle passenger instead of the position of the own vehicle M to the destination.

For example, the navigation device 50 takes the current position of the own vehicle M or any position designated by the vehicle passenger as a guide start location for processing, and evaluates multiple path candidates from the guide start location to a guide end location as the destination according to prescribed evaluation conditions respectively. The prescribed evaluation conditions are: the shortest traveling time or traveling distance, the lowest prices of a charging road and the like, being an express way, etc. Such prescribed evaluation conditions can be freely changed according to an operation of the vehicle passenger. For example, when judging consistency of the evaluation conditions, the navigation device 50 uses traveling time, traveling distance, existence of the charging road, tolls and the like to evaluate the multiple candidate paths respectively.

Besides, the navigation device 50 derives the path candidate consistent with the prescribed evaluation condition in the path candidates and having a highest comprehensive evaluation in consideration of all evaluation items or the path candidate having the highest path candidate relative to part of evaluation items as the guide path. In addition, the evaluation conditions can be weighted through operation of the vehicle passenger. For example, the path candidate with the shorter traveling time is derived as the guide path in more priority for weighting.

The navigation device 50 outputs information representing the derived guide path to the vehicle control system 100. In addition, the information representing the guide path can also contain the information representing the path candidate not selected as the guide path but for example evaluated to be the second or third. The information representing the guide path is stored in a storage part 180 of the vehicle control system 100 mentioned below as guide path information 182.

Besides, the navigation device 50 for example can determine or replenish the position of the own vehicle M by using an Inertia Navigation System (INS) output by using a vehicle sensor 60. Besides, the navigation device 50 can guide through a sound or navigation display for the path to the destination when the vehicle control system 100 execute a manual driving mode. In addition, the structure for determining the position of the own vehicle M or the structure for evaluating the path candidates can be set independent from the navigation device 50. Besides, the navigation device 50 for example can be realized through functions of a terminal device such as a smartphone or tablet terminal held a user. At this point, the terminal device and the vehicle control system 100 can receive and send information based on wireless or wired communication.

The communication device 55 for example performs wireless communication using a cellular net or a Wireless Fidelity (Wi-Fi) net, Bluetooth (registered trademark), Dedicated Short Range Communication (DSRC), etc. For example, the communication device 55 wirelessly communicates with a server for information provision of a system for monitoring a traffic condition of a road such as a Vehicle Information and Communication System (VICS) (registered trademark), to obtain information (step short for traffic information hereinafter) representing the traffic condition of a traveling road of the own vehicle M or the traffic condition of a prescribed traveling road. The traffic information contains front congestion information, required time of a congestion location, accident/failed vehicle/construction information, velocity limitation/lane restriction information, positions of parking lots, full vehicle/empty vehicle information of the parking lot/service area/parking area, and the like. Besides, the communication device 55 can communicate with a wireless beacon in a lateral area of the road side, or performs vehicle-vehicle communication with other vehicles travelled around the own vehicle M, thereby obtaining the traffic information.

The vehicle sensor 60 contains a vehicle velocity sensor detecting a vehicle velocity, an acceleration sensor detecting an acceleration, a yaw rate sensor detecting an angular velocity around a plumb axis, a direction sensor detecting a direction of the own vehicle M, and the like.

FIG. 3 is a structural diagram of an HMI 70, which for example has a structure of a driving operation system and a structure of a non-driving operation system. Their boundaries are unclear, and the structure of the driving operation system can also have functions of the non-driving operation system (or vice versa).

As the structure of the driving operation system, the HMI 70 for example contains an accelerator pedal 71, an acceleration opening sensor 72, an accelerator pedal counteraction force output device 73, a brake pedal 74, a brake pedalling quantity sensor (or main pressure sensor, etc.) 75, a shift lever 76, a gear sensor 77, a steering wheel 78, a steering rudder angle sensor 79, a steering torque sensor 80 and other driving operation devices 81.

The accelerator pedal 71 is an operation device used for accepting an acceleration indication (or deceleration indication based on a recovery operation). The acceleration opening sensor 72 detects a pedalling quantity of the accelerator pedal 71, and outputs an accelerator opening signal expressing the pedalling quantity to the vehicle control system 100. In addition, the output to the vehicle control system 100 can be replaced with the direct output to the travel driving force output device 200, the steering device 210 or the brake device 220. The constitution of other driving operation systems explained hereinafter is also the same. The accelerator pedal counteraction force output device 73, for example according to the indication from the vehicle control system 100, outputs a force (operation counteraction force) in a direction opposite to an operation direction relative to the accelerator pedal 71.

The brake pedal 74 is an operation device used for accepting a deceleration indication of the vehicle passenger. The brake pedalling quantity sensor 75 detects the pedalling quantity (or pedalling force) of the brake pedal 74, and outputs a brake signal expressing a detection result to the vehicle control system 100.

The gear lever 76 is an operation device used for accepting a change indication of a shift stage based on the vehicle passenger. The gear sensor 77 detects a gear indicated by the vehicle passenger and outputs a gear signal expressing the detection result to the vehicle control system 100.

The steering wheel 78 is an operation device for accepting a steering indication of the vehicle passenger. The steering rudder angle sensor 79 detects an operation angle of the steering wheel 78 and outputs a steering rudder signal expressing the detection result to the vehicle control system 100. The steering torque sensor 80 detects a torque applied to the steering wheel 78 and outputs a signal expressing a steering torque signal of the detection result to the vehicle control system 100.

Other driving operation devices 81 comprise such as a joystick, a button, a dial switch, a Graphic user Interface (GUI) switch, etc. Other driving operation devices 81 accept the acceleration indication, the deceleration indication, the steering indication, etc., and output to the vehicle control system 100.

As the structure of the non-driving operation system, the HMI 70 for example contains a display device 82, a speaker 83, a contacting operation detection device 84 and a contents playing device 85, various operation switches 86, a seat 88, a seat driving device 89, window glass 90, a window driving device 91, a camera in compartment 92 and an air conditioner device 93. Part of the structure of the non-driving operation system of the HMI 70 is one example of "operation accepting part" accepting operation contents and is one example of "output part" outputting information.

The display device 82 for example is a Liquid Crystal Display (LCD) or Electroluminescence (EL) display device, etc., mounted on each part of an instrument panel, a co-passenger seat or any position opposite to a rear seat. Besides, the display device 82 can be a Head Up Display (HUD) projecting an image to the front windshield or other windows. The speaker 83 outputs a sound. The contacting operation detection device 84 detects a contacting position (touch position) on a display picture of the detection device 82 under a condition that the display device 82 is a touch screen and outputs to the vehicle control system 100. In addition, under the condition that the display device 82 is a non-touch display screen, the contacting operation detection device 84 can be omitted.

The contents playing device 85 for example contains a Digital Versatile Disc (DVD), a playback device, a Compact Disc (CD) playback device, a television receiver, a generation device of various guide devices, etc. Part or all of the display device 82, the speaker 83, the contacting operation detection device 84 and the contents playing device 85 can also be a structure shared with the navigation device 50.

Respective operation switches 86 are configured in any positions in a compartment and contain an automatic driving changeover switch 87 indicating starting (or starting in the future) and stopping of the automatic driving. The automatic driving changeover switch 87 is any one of a GUI (Graphic User Interface) switch and a mechanical switch. Besides, the respective operation switches 86 can also contain a switch for driving the seat driving device 89 or the window driving device 91.

The seat 88 is a seat seated by the vehicle passenger. The seat driving device 89 for example drives the seat 88 from a reclining angle, a front and back direction position, a deflection angle, etc. . . . . The window glass 90 for example is disposed on each vehicle door. The window glass driving device 91 opens, closes and drives the window glass 90.

The camera in compartment 92 is a digital camera using a solid camera device such as a CCD or CMOS. The camera in compartment 92 is mounted in a position where at least the head of the vehicle passenger who drives can be photographed, such as a back mirror or a steering boss part, an instrument panel, etc. The camera in compartment 92 for example periodically repeatedly photographs the vehicle passenger. The air conditioner device 93 adjusts a temperature or humidity or air volume in a compartment.

Back to FIG. 2, the energy residue calculating part 95 calculates the energy (residue) in a battery disposed in the own vehicle M in order to operate the finder DD and periphery monitoring devices or each of the navigation device 50, the communication device 55, the vehicle sensor 60 and the HMI 70 (driving operation system or non-driving operation system, etc.). Besides, the energy residual calculating part 95 also calculates the residual of the energy driving a power source of the own vehicle M. For example, the energy residual calculating part 95 also calculates the residual of a liquid fuel such as gasoline burning in an internal combustion engine when the own vehicle M is a vehicle taking the internal combustion engine as the power source. Besides, the energy residual calculating part 95 also calculates the residual of a battery output power driving an electromotor when the own vehicle M is a vehicle taking the electromotor as the power source. Besides, the energy residual calculating part 95 also calculates the residual of both the liquid fuel and the battery when the own vehicle M is a hybrid vehicle having both the internal combustion engine and the electromotor.

Besides, the battery detected by the energy residue calculating part 95 can also be connected to an engine of the travel driving force output device 200, and is charged by using part of output of the engine. Besides, the battery can also be charged by using a facility having a charging device or a road having a non-contacting charging lane. The energy residue calculating part 95 for example can also calculate a State Of Charge (step SOC) of the battery, which is used as the energy residue. In addition, the "SOC" in the present specification can also be called as "charging volume".

Next, before the vehicle control system 100 is explained, the travel driving force output device 200, the steering device 210 and the brake device 220 are explained.

The travel driving force output device 200 is used for outputting a travel driving force (torque) for the vehicle to driving wheels. The travel driving force output device 200 for example has an engine, a transmission and an engine Electronic Control Unit (ECU) controlling the engine when the own vehicle M is a vehicle taking the internal combustion engine as a power source, has a motor for driving and a motor ECU controlling the motor for driving when the own vehicle M is an electric vehicle taking the electromotor as a power source and has an engine, a transmission, an engine ECU, a motor for driving and a motor ECU when the own vehicle M is a hybrid vehicle. Under the condition that the travel driving force output device 200 only contains the engine, the engine ECU adjusts a throttle opening or gear according to information input from a later traveling control part 160. Under the condition that the travel driving force output device 200 only comprises the motor for driving, the motor ECU adjusts a duty ratio of a Pulse Width Modulation (PWM) signal given to the motor for driving according to the information input from the traveling control part 160. Under the condition that travel driving force output device 200 only comprises the engine and the motor for driving, the engine ECU and the motor ECU control a travel driving force harmonically according to the information input from the traveling control part 160.

The steering device 210 for example has a steering ECU and an electromotor. The electromotor for example changes the direction of a steering wheel by acting a force on a rack and pinion mechanism. The steering ECU drives the electromotor according to the information input from the vehicle control system 100 or input steering rudder angle or steering torque information so as to change a direction of the steering direction.

The brake device 220 for example is an electric servo brake device having a brake calliper, a cylinder transmitting a hydraulic pressure to the brake calliper, an electromotor enabling the cylinder to generate the hydraulic pressure and a brake control part. The brake control part of the electric servo brake device controls the electromotor according to the information input from the traveling control part 160 so as to output a corresponding brake torque the brake operation to each wheel. The electric servo brake device has a mechanism transmitting the hydraulic pressure generated by the operation of the brake pedal to the cylinder through a master cylinder as a backup. In addition, the brake device 220 is not limited to the explained electric servo brake device and can also be an electronic control type hydraulic brake device. The electronic control type hydraulic brake device controls an actuator according to the information input from the traveling control part 160 to transmit the hydraulic pressure of the master cylinder to the cylinder. Besides, the brake device 200 can also contain a regenerative brake, which uses the motor for driving contained in the travel driving force output device 200.

[Vehicle Control System]

The vehicle control system 100 is explained hereinafter. The vehicle control system 100 for example is realized by more than one processor or hardware having the same functions. The vehicle control system 100 can be a structure formed by constituting processor such as a Central Processing Unit (CPU), an ECU (electronic Control unit) formed by connecting a memory device and a communication port through an internal bus or a Micro-Processing Unit (MPU).

The vehicle control system 100 for example has a target lane determination part 110, an automatic driving control part 120, a traveling control part 160, HMI control part 170, a storage part 180 and an energy control part 190. The automatic driving control part 120 for example has an automatic driving mode control part 130, an own vehicle position recognizing part 140, an outside recognizing part 142, an action plan generation part 144, a trajectory generation part 146 and a changeover control part 150.

Each part in the target lane determination part 110, the automatic driving control part 120 and part or all of the traveling control part 160, the HMI control part 170 and the energy control part 190 can be realized by hardware such as a Large Scale Integration (LSI) or an Application Specific Integrated Circuit (ASIC), and can also be realized by combining software with hardware.

In the storage part 180, for example, stores information such as high precision map information 181, guide path information 182, target lane information 183, action plan information 184, mode differentiation operation yes/no information 185, function limiting information 186, etc. The storage part 180 is realized by using a Read Only Memory (ROM) or a Random Access Memory (RAM), a Hard Disc Drive (HDD), a flash memory, etc. A program executed by the processor can be prestored in the storage part 180 and can also be downloaded from an external device through a vehicle-mounted international Internet device, etc. Besides, the program can also be installed in the storage part 180 by mounting a portable memory medium storing such program into an unshown drive device. Besides, a computer (vehicle-mounted computer) of the vehicle control system 100 can be dispersed through a plurality of computer devices.

The target lane determination part 110 for example is realized by an MPU. The target lane determination part 110 divides a guide path into a plurality of blocks with reference to the guide path information 182 output from the navigation device 50. The target lane determination part 110 for example divides the guide path every 100 [m] about a vehicle advancing direction. Besides, the target lane determination part 110 decides the target lane where the own vehicle M is travelled in the guide path divided into all blocks by referring to the high precision map information 181. The target lane determination part 110 for example makes a decision of traveling from which lane on the left. The target lane determination part 110 for example decides the target lane in a manner that the own vehicle M can be travelled in a reasonable driving path advancing to a fork road under a condition that a fork road or converging part exists in the path. The target lane determined by the target lane determination part 110 takes the determined target lane as the target lane information 183 to store in the storage part 180.

The high precision map information 181 is map information of which the precision is higher than that of a navigation map of the navigation device 50. The high precision map information 181 for example comprises central information of a lane, or boundary information of the lane. Besides, the high precision map information 181 can contain road information, traffic limitation information, residence information (residence and post code), facility information, telephone number information, etc. The road information contains information expressing road variety such as an express way, toll road, national road and country road; or information such as a road lane number, a width of each lane, a slope of the road, road positions (three dimensional coordinates containing longitude, latitude and height), a curve curvature of the lane, a converging and fork point position of the lane, signs on the road, and the like. The traffic limitation information contains information that the lane is blocked due to construction or traffic accidents and congestion.

The automatic driving control part 120 for example automatically performs at least one of velocity control and steering control of the own vehicle by implementing any of multiple driving modes with different automatic driving degrees. In addition, the velocity control for example is control over acceleration and deceleration of the own vehicle M, and the acceleration and deceleration contain one or both of the acceleration and deceleration. Besides, the automatic driving control part 120 controls manual driving based on an operation accepted by the operation accepting part such as the HMI 70, and the manual driving is to perform both the velocity control and steering control of the own vehicle M based on the operation of a driver of the own vehicle M.

The automatic driving mode control part 130 decides modes of automatic driving executed by the automatic driving control part 120. The modes of the automatic driving in the present embodiment contain the following modes. In addition, the following modes are only an example, and the mode number of the automatic driving can be freely determined.

[Mode A]

The mode A is the mode with the highest automatic driving mode. When the mode A is executed, all vehicle control is performed automatically, for example, complex converging control, therefore, the vehicle passenger does not need to monitor the peripheral or state of the own vehicle M (there is no periphery monitoring duty).

[Mode B]

The mode B is a mode in which the automatic driving degree is second to the mode A. When the mode B is executed, all vehicle control is performed automatically on principle, but according to a scenario, the driving operation of the own vehicle M is relegated to the vehicle passenger. Therefore, the vehicle passenger must monitor the periphery or state of the own vehicle M (there is periphery monitoring duty).

[Mode C]

The mode C is a mode in which the automatic driving degree is only second to the mode B. When the mode C is executed, the vehicle passenger must perform corresponding confirming operation corresponding to the scenario on the HMI 70. In the mode C, for example, the vehicle passenger is informed of the lane change timing, when the vehicle passenger performs operation of changing the lane on the HMI 70, automatic lane change is performed. Therefore, the vehicle passenger must monitor the periphery or state of the own vehicle M (there is periphery monitoring duty). In addition, the mode with the lowest automatic control degree for example may be not the automatic driving and is the manual driving mode which performs both the velocity control and steering control of the own vehicle M based on the operation of the vehicle passenger of the own vehicle M. Under the condition of the manual driving mode, of course the vehicle passenger (driver) needs the periphery monitoring duty.

The automatic driving mode control part 130 decides the automatic driving mode based on the operation of the vehicle passenger on the HMI 70, an event determined by the action plan generation part 144 and a travel condition determined by the trajectory generation part 146. The automatic driving mode is informed to the HMI control part 170. Besides, in the automatic driving mode, a boundary corresponding to the performances of the DD of the own vehicle M can also be set. For example, if the performances of the DD are lower, then the mode A cannot be performed. Under any mode, the manual driving mode (override) can be switched specific to the operation of the structure of the driving operation system in the HMI_70.

The position recognizing part 140 of the own vehicle of the automatic driving control part 120 recognizes lane (traveling lane) where the own vehicle M is travelled and a relative position of the own vehicle M relative to the traveling lane based on the high precision map information 181 stored in the storage part 180 and information input from the finder 20, the radar 30, the camera 40, the navigation device 50 or the vehicle sensor 60.

The position recognizing part 140 of the own vehicle for example compares a graph (for example arrangement of solid line and virtual line) of a road division line recognized from the high precision map information 181 with that of the road division line of the periphery of the own vehicle M recognized from an image photographed by the camera 40, and thus recognizes the traveling lane. In such recognizing, the position of the own vehicle M obtained from the navigation device 50 or a processing result based on INS can also be considered.

Figure 4:
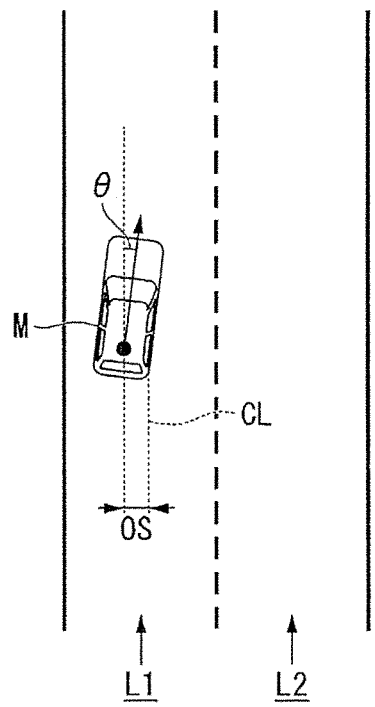
FIG. 4 is a diagram illustrating a condition that a self vehicle position recognizing part 140 recognizes a relative position of the own vehicle M relative to a traveling lane L1.

FIG. 4 is a diagram of condition that a position recognizing part 140 of the own vehicle recognizes a relative position of the own vehicle M relative to a traveling lane L1. The position recognizing part 140 of the own vehicle for example recognizes a deviation OS from a reference point (for example gravity center) of the own vehicle M to the central CL of the traveling lane and the angle θ between the advancing direction of the own vehicle M relative to a line connected to the central CL of the traveling lane as a relative position of the own vehicle M relative to the traveling lane L1. In addition, alternatively, the position recognizing part 140 of the own vehicle recognizes the position of the reference point of the own vehicle M relative of any side end part of the traveling lane L1 as a relative position of the own vehicle M relative to the traveling lane. The relative position of the own vehicle M recognized by the own vehicle position recognizing part 140 is provided for the target lane determination part 110.

The outside recognizing part 142 recognizes the position and velocity, the acceleration and other states of peripheral vehicles based on the information input from the finder 20, the radar 30 and the camera 40. The so-called peripheral vehicles for example are vehicles driven at the periphery of the own vehicle M and the vehicles driven in the direction same as the own vehicle M. The positions of the peripheral vehicles can be represented by representing points such as the gravity center or corner of other vehicles and can also be repressed by a region expressed by the profiles of other vehicles. The "state" of the peripheral vehicles can also contain the acceleration of the peripheral vehicles and whether the lane change is being performed (or whether the lane change is about to be performed) learned based on the information of various devices. Besides, the outside recognizing part 142 can also recognize the positions of a guardrail or a telegraph pole, a parked vehicle, a walker and other objects expect for the peripheral vehicles.

The action plan generation part 144 sets start location and/or a destination of the automatic driving. The start location of the automatic driving can be the current position of the own vehicle M or a location where the automatic driving operation is performed. The action plan generation part 144 generates an action plan for an interval between the start location and the destination of the automatic driving. In addition, the action plan generation part 140 is not limited thereto and can generate an action plan at any interval.

The action plan contains multiple events executed in sequence. The events for example contain a deceleration event decelerating the own vehicle M; or an acceleration event accelerating the own vehicle M; a lane keep event driving the own vehicle M in a manner of not deviating from the traveling lane; a lane change event changing the traveling lane; an overtaking event enabling the own vehicle M to overtake a preceding vehicle; a fork event changing the required lane at a fork point or driving the own vehicle M in a manner of not deviating from the current traveling lane; a converging event accelerating and decelerating the own vehicle M in a converging lane converged to a high street and changing the traveling lane; and a handover event converting the manual driving mode to the automatic driving mode at the start location of automatic driving or converting the automatic driving mode to the automatic driving mode at an ending predicted location of the automatic driving. The action plan generation part 144 sets the lane change event, the fork event or the converging event in a position of switching the target lane determined by the target lane determination part 110. The information expressing the action plan generated by the action plan generation part 144 is stored in the storage part 180 as the action plan information 184.

Figure 5:
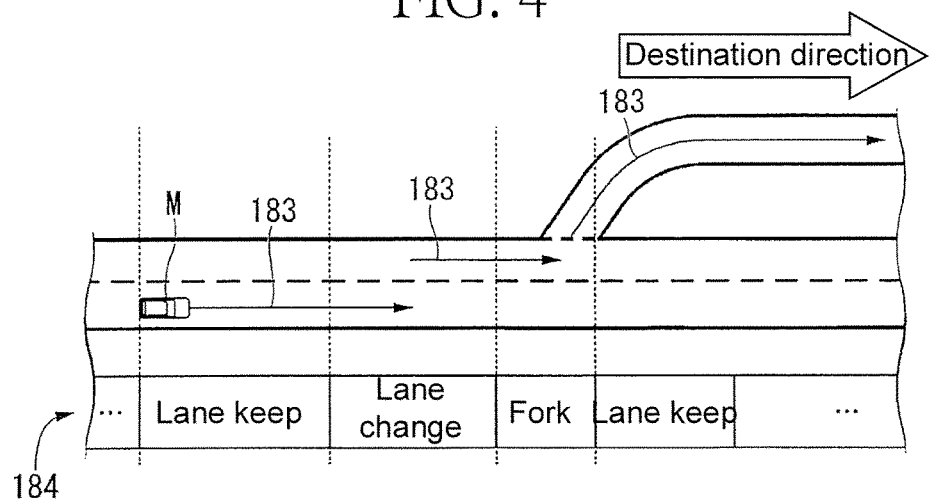
FIG. 5 is a diagram illustrating an example of an action plan generated in certain interval.

FIG. 5 is a diagram illustrating an example of an action plan generated at certain interval. As shown in the drawing, the action plan generation part 144 generates the action plan required by the traveling of the own vehicle M in the target lane as shown in the target lane information 183. In addition, the action plan generation part 144 can also dynamically change the action plan according to the condition of the own vehicle M regardless of the target lane information 183. For example, when the velocity of the peripheral vehicles recognized by the outside recognizing part 142 exceeds a threshold value or a moving direction of the peripheral vehicles travelled on the lane adjacent to the own lane faces the direction of the own lane, the action plan generation part 144 changes the event of the own vehicle M set at the preset traveling interval. For example, if the event is set in a manner of executing the lane change event after the lane keep event, then when it is judged that the vehicle is driven at a velocity larger than the threshold value from a position behind the lane of the lane change target in the lane keep event according to a recognizing result of the outside recognizing part 142, the action plan generation part 144 can also change the next event of the lane keep event to the deceleration event or the lane keep event from the lane change event. As a result, the vehicle control system 100 can automatically drive the own vehicle M safely even if under the condition that the outside state is changed.

Figure 6:
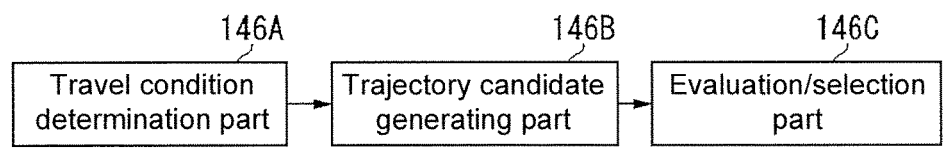
FIG. 6 is a diagram illustrating one example of a structure of a trajectory generation part 146 in a first embodiment.

FIG. 6 is a diagram illustrating an example of constitution of a trajectory generation part 146. The trajectory generation part 146 for example has a travel condition determination part 146A, a trajectory candidate generation part 146B and an evaluation/selection part 146C.

The travel condition determination part 146A for example decides any travel condition of fixed velocity traveling, following traveling, low velocity following traveling, deceleration traveling, curve traveling and obstacle avoiding traveling during the lane keep event. At this point, the travel condition determination part 146A decides the travel condition to be fixed velocity traveling when there are no other vehicles in front of the own vehicle M. Besides, the travel condition determination part 146A decides the travel condition to be following traveling when performing following driving is relative to a preceding vehicle. Besides, the travel condition determination part 146A decides the travel condition to be low-velocity following traveling during a congestion scenario, etc. Besides, the travel condition determination part 146A decides the travel condition to be fixed deceleration traveling when the outside recognizing part 142 recognizes the deceleration of the preceding vehicle or the stopping or parking events are performed. Besides, the travel condition determination part 146A decides the travel condition to be curve traveling when the outside recognizing part 142 recognizes that the own vehicle M is close to a curve. Besides, the travel condition determination part 146A decides the travel condition to be obstacle avoiding traveling when the outside recognizing part 142 recognizes that there is an obstacle in front of the own vehicle M. Besides, the travel condition determination part 146A decides the travel condition corresponding to each event when executing the lane change event, the overtaking event, the fork event, the converging event, the handover event and the like.

Figure 7:
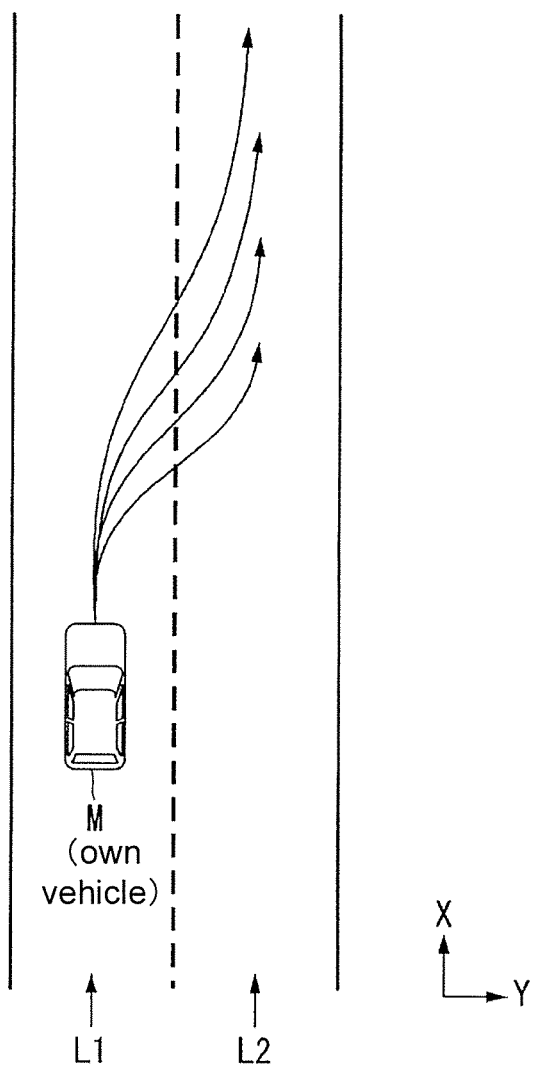
FIG. 7 is a diagram illustrating an example of a trajectory candidate generated by a trajectory candidate generation part 146B.

The trajectory candidate generation part 146B generates a trajectory candidate based on the travel condition determined by the travel condition determination part 146A. FIG. 7 is a diagram illustrating an example of a trajectory candidate generated by a trajectory candidate generation part 146B. FIG. 7 expresses the trajectory candidate generated when the own vehicle M changes the lane from L1 to the L2.

Figure 8:
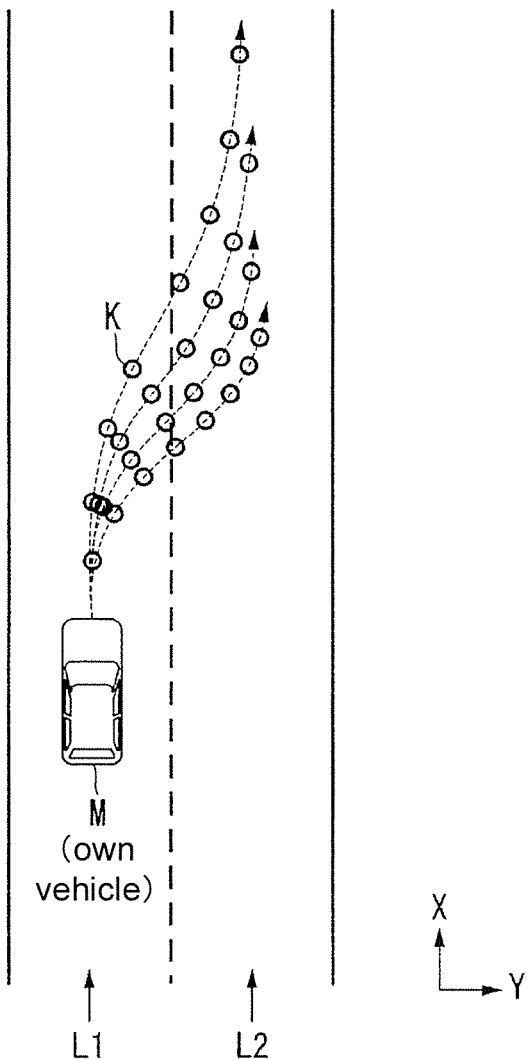
FIG. 8 is a diagram illustrating a trajectory candidate generated by the trajectory candidate generation part 146B with a trajectory point K.

The trajectory candidate generation part 146B decides a trajectory as shown in FIG. 7 into for example a set of the target position (trajectory point K) that the reference position (for example gravity center or rear wheel axis center) of the own vehicle M should arrive at in each prescribed time in the future. FIG. 8 is a diagram illustrating the trajectory candidate generated by the trajectory candidate generation part 146B with a trajectory point K. The wider the interval of the trajectory point K, the faster the velocity of the own vehicle M, and the narrower the interval of the trajectory point K, the slower the velocity of the own vehicle M. Therefore, when the trajectory generation part 146 is about to accelerate, the interval of the trajectory point K is widened gradually, and the interval of the trajectory point is narrowed when the trajectory candidate generation part 146B is about to decelerate.

In this way, since the trajectory point K contains a velocity component, the trajectory candidate generation part 146B must give a target velocity to the trajectory point K. The target velocity is determined by the travel condition determined by the travel condition determination part 146A.

Figure 9:
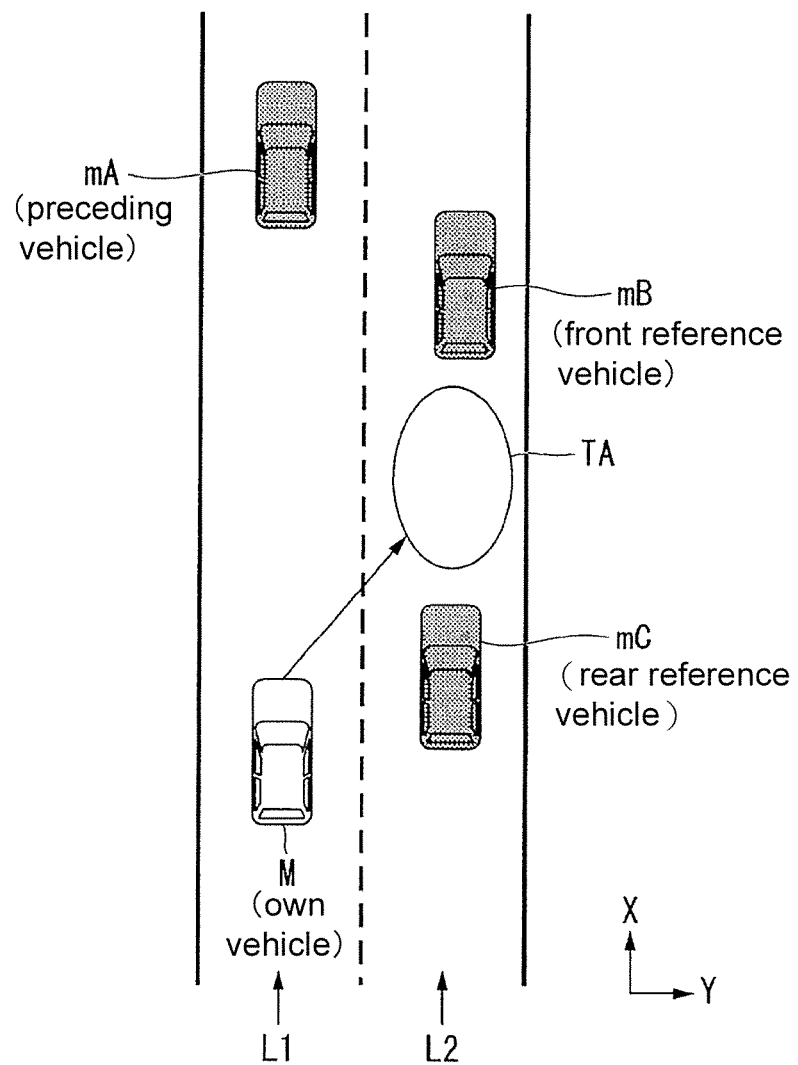
FIG. 9 is a diagram illustrating a lane change target position TA.

Herein, the method of deciding the target velocity when the lane is changed (containing fork) is explained. The trajectory candidate generation part 146B firstly sets a lane change target position (or converge target position). The lane change target position is set as a relative position of the peripheral vehicles and "the lane is changed between which peripheral vehicles" is determined. The trajectory candidate generation part 146B focuses three peripheral vehicles by taking the lane change target position as a reference and decides the target velocity during lane change. FIG. 9 is a diagram illustrating a lane change target position TA. In the drawing, L1 expresses an own lane, and L2 is an adjacent lane. Herein, in the lane same as the own vehicle M, the peripheral vehicles driven in right front of the own vehicle M are defined as preceding vehicles mA, the peripheral vehicles driven in right front of the lane change target position TA are defined as front reference vehicles mB, and the peripheral vehicles driven right behind the lane change target position TA are defined as rear reference vehicles mC. The own vehicle M must be accelerated and decelerated in order to move to the position aside the lane change target position TA, but at this point, gaining on the preceding vehicles mA must be avoided. Therefore, the trajectory candidate generation part 146B predicts a future state of three peripheral vehicles and decides the target velocity in a manner of not interfering with the peripheral vehicles.

FIG. 10 is a diagram of a velocity generating model when the velocities of three peripheral vehicles are assumed to be fixed. In the drawing, the straight lines from mA, mB and mC express displacements in the advancing direction when each peripheral vehicle is driven at fixed velocity. The own vehicle M is located between the front reference vehicle mB and the rear reference vehicle mC at a point CP that the lane change is finished, and must be located behind the preceding vehicle mA before this. Under such limitation, the trajectory candidate generation part 146B derives multiple time sequence graphs of the target velocity till the lane change is finished. Besides, by applying the time sequence graphs of the target velocity to models such as a spline curve, multiple tract candidates as shown in FIG. 8 can be derived. In addition, motion graphs of the three peripheral vehicles are not limited to the fixed velocity as shown in FIG. 10, and prediction can also be performed by taking a constant velocity and a constant acceleration (jerk) as a premise.

The evaluation/selection part 146C evaluates based on two opinions of planning and safety of the trajectory candidate generated by the trajectory candidate generation part 146B so as to select the trajectory output to the traveling control part 160. According to the planning opinion, for example, if the following feature of the generated plan (for example action plan) is high and the whole length of the trajectory is short, then the trajectory evaluation is high. For example, under the condition of expecting to change the lane rightward, the evaluation on the trajectory of temporarily changing the lane leftward and then returning is low. According to the opinion of safety, for example, in each trajectory point, the farther the distance from the own vehicle M to an object (peripheral vehicles, etc.) is, the smaller the variable of the acceleration and deceleration or rudder angle is, and then the higher the evaluation is.

The changeover control part 150 is switched between the automatic driving mode and the manual driving mode based on the signal and the like input from the automatic driving changeover switch 87. Besides, the changeover control part 150 switches to the manual driving mode from the automatic driving mode based on the indication acceleration, deceleration or steering operation specific to the constitution of the driving operation system in the HMI 70. For example, the changeover control part 150 switches to the manual driving mode (override) from the automatic driving mode when the state that an operation quantity shown by the signal input by the constitution of the driving operation system in the HMI 70 exceeds a threshold value lasts for more than reference time. Besides, the changeover control part 150 can also restore the automatic driving mode when there is no operation specific to the constitution of the driving operation system in the HMI 70 being detected during the prescribed time after the override is switched to the manual driving mode.

The traveling control part 160 controls the travel driving force output device 200, the steering device 210 and the brake device 220 to cause the own vehicle M to pass by a trajectory generated by the trajectory generation part 146 according to a preset moment.

FIG. 11 is a diagram representing a structure of an HMI control part 170. The HMI control part 170 for example has a mode differentiation control part 172 and an information providing part 174.

The mode differentiation control part 172 controls the control HMI 70 according to the variety of the automatic driving mode with reference to the mode differentiation operation yes/no information 185 when the automatic driving control part 120 notifies the automatic driving mode information.

FIG. 12 is a drawing illustrating an example of the mode differentiation operation yes/no information 185. The differentiation operation yes/no information 185 as shown in FIG. 12 for example has items of "a manual driving mode", "an automatic driving mode" as items of the driving mode. Besides, as "the automatic driving mode", there are the "mode A,", "the mode B", "the mode C" and the like. Besides, the differentiation operation yes/no information 185 has an operation, i.e., "navigation operation" specific to the navigation device 50, an operation i.e., "content playing operation" specific to the contents playing device 85, an operation, i.e., "instrument panel operation" specific to the display device 82, etc., to serve as items of the non-driving operation system. In the example of the differentiation operation yes/no information 185 as shown in FIG. 12, whether the vehicle passenger operates non-driving operation system or not is set specific to each driving mode, but an interface device of the object is not limited thereto.

The mode differentiation control part 172 judges the devices which are allowed to be used and the devices which are not allowed to be used. Besides, the mode differentiation control part 172 controls an operation that whether the operation specific to the HMI 70 or the navigation device 50 of the non-driving operation system by the vehicle is accepted or not based on a judging result.

For example, when the driving mode executed by the vehicle control system 100 is the manual driving mode, the vehicle passenger operates structures (for example, the accelerator pedal 71, the brake pedal 74, the shift lever 76 and the steering wheel 78) of the driving operation system of the HMI 70. Besides, when the driving mode executed by the vehicle control system 100 is the mode B, the mode C and the like of the automatic driving modes, the vehicle passenger has a duty of monitoring the periphery of the own vehicle M. Under such condition, in order to prevent attention distraction (driver destruction) caused by other actions (for example the operation of the HMI 70, etc.) except for driving of the vehicle passenger, the mode differentiation control part 172 controls in a manner of not accepting part or all of operations to the non-driving operation system of the HMI 70. At this point, the mode differentiation control part 172 can display the existence of the peripheral vehicles of the own vehicle M recognized by the outside recognizing part 142 and a state of the peripheral vehicles on the display device 82 and other output parts as images, etc., and causes the display device HMI 70 to accept a confirmation operation corresponding to a scenario where the own vehicle M is traveling.

Besides, when the driving mode of the mode differentiation control part 172 is the automatic driving mode A, the limitation of driver destruction can be loosed, and the control of accepting the operation of the vehicle passenger who does not accept operation specific to the non-driving operation system is performed. For example, the mode differentiation control part 172 causes the display device 82 to display an image or the speaker 83 to output a sound, or causes the contents playing device 85 to play contents from a Digital Video Disc (DVD). In addition, except for the content stored in the DVD, the contents played by the content playing device 85 for example can contain various contents related to amusement and entertainment. Besides, the "contents playing operation" as shown in FIG. 12 means that the contents operation can be related to such amusement and entertainment.

The information providing part 174, based on the judging result of the energy control part 190 mentioned later, uses the display device 82 or speaker 83 of the HMI 70 to inform the vehicle passenger of various information. The informed information is mentioned below in detail.

FIG. 13 is a diagram representing a structure of an energy control part 190. The energy control part 190 for example has an energy deriving part 192, an energy insufficiency judging part 194 and a function limiting part 196. In addition, each processing in the energy control part 190 is repeatedly performed every prescribed time.

The energy deriving part 192 derives the energy predicted to be consumed in the future (step Short for "energy predicted to be consumed") till the own vehicle M arrives at the destination based on an action plan or path condition in a traveling path when the vehicle drives on the traveling path from a current position of the own vehicle M to a destination. The energy deriving part 192 for example derives the energy predicted to be consumed of the own vehicle M from the current position to the destination based on the guide path information 182 output by the navigation device 50. For example, the energy deriving part 192 assumes that during the period from the current position to the destination, the own vehicle M is driven at a velocity taking a legal velocity or average velocity of the road shown by the guide path, and the energy consumed by the own vehicle M during such period is derived to be the energy predicted to be consumed.

Besides, the energy deriving part 192 for example can also derive the energy predicted to be consumed in the future by using an index obtained by dividing the energy consumed in the past by values of unit time or unit distance. Besides, the energy deriving part 192 can also derive the energy predicted to be consumed by considering time till a congestion or accident is eliminated when judging that the congestion or accident occurs on the road shown by the guide path with reference to the traffic information obtained by the communication device 55.

Besides the energy deriving part 192 can also derive the energy consumed by each function in the automatic driving. For example, in the periphery monitoring device (for example finder DD) monitoring the periphery in automatic driving, functions of all devices (for example the detector 20, the radar 30, the camera 40, etc.) are different. Therefore, for each periphery monitoring device, the energy predicted to be consumed by unit time or unit distance during use is derived. Therefore, the following information can be mastered, that is, for example, in the detector 20, radar 30 and camera 40 contained in the finder DD, compared with the camera 40, the energy predicted to be consumed during operation of the detector 20 is larger. Besides, compared with the detector 20, the energy predicted to be consumed during operation of the radar 30 is larger.

The energy insufficiency judging part 194 judges whether the insufficiency of the energy of the own vehicle M may be caused by automatic driving of the own vehicle M. The energy insufficiency judging part 194 judges the insufficiency of the energy at present or in the future.

For example, the energy insufficiency judging part 194 judges the energy insufficiency of the vehicle when the energy residue calculated by the energy residue calculating part 95 is lower than a preset threshold value. Besides, the energy insufficiency judging part 194 can also judge the whether the energy relative to the residue traveling time or traveling distance to the destination is insufficient based on the energy predicted to be consumed in each prescribed time or prescribed distance and the energy (residue) calculated by the energy residue calculating part 95. For example, the energy insufficiency judging part 194 judges the energy insufficiency when a value obtained by multiplying the energy to be consumed in each unit time or unit distance by the residue traveling time or traveling distance to the destination exceeds the energy residue.

The function limiting part 196 limits the functions related to the automatic driving of the own vehicle M when the energy insufficiency judging part 194 judges the energy is insufficient at present or in the future. For example, the function limiting part 196 can limits the functions related to automatic driving specific to each control direction observed from the own vehicle M in automatic driving. For example, the function limiting part 196 limits a monitored object range of the periphery monitoring device used by automatic driving when the energy of the own vehicle M is insufficient. The periphery monitoring device can be the finder DD and can also contain the outside recognizing part 142. For example, the function limiting part 196 implements the function limiting of the own vehicle M in automatic driving with reference to the function limiting information 186 stored in the storage part 180.

FIG. 14 is a diagram illustrating one example of the function limiting information 186. In the example in FIG. 14, as an item of the function limiting information 186, for example, there are "periphery monitoring device" and "limiting mode". As the "periphery monitoring device", for example, respective finders DD (detector 20, radar 30 and camera 40) for periphery monitoring of the own vehicle M in automatic driving are set. For the detector 20 and radar 30, for example, the detectors 20-1 to 20-7 and radars 30-1 to 30-6 as shown in FIG. 1 are respectively disposed in at least one of the front, right, left and rear of the own vehicle M according to the setting position of the own vehicle M.

For example, under the condition of the detector (front), the detectors 20-1 to 20-3 as shown in FIG. 1 become objects. Besides, under the condition of the detector (right), the detectors 20-3 and 20-6 become objects. Besides, under the condition of the detector (left), the detectors 20-2 to 20-5 become objects. Besides, under the condition of the detector (rear), the detectors 20-4 to 20-6 become objects. In addition, the detector 20-7 has a detection region of 360 degrees relative to a horizontal direction, and stops motoring in no matter which limiting mode. The radars 30-1 to 30-6 can be distributed similar to the detectors. Besides, since the camera 40 photographs the front of the own vehicle M, therefore, a monitored object is the front of the own vehicle M.

Besides, the "limiting mode" as shown in FIG. 14 sets a periphery monitoring mode stopping monitoring of the object in order to inhibit the consumed energy. In the example as shown in FIG. 14, the so-called "monitoring" is a monitoring (detecting) function implemented in a control direction (for example, front, right, left or rear) of an object observed from the own vehicle M in automatic driving, at this point, an object device operates and thus consumes energy. Besides, the so-called "stopping" is to stop the monitoring function in the control direction, at this point, the object device stops and thus consumes no energy.

In the example of FIG. 14, as the limiting mode, modes 1-3 are set, but a quantity of the setting modes is not limited thereto as long as at least one limiting mode is set. Besides, under the condition that multiple limiting modes are set, according to each mode, the inhibited energy is different, therefore, the function limiting can be loosened or enhanced through mode selection. For example, in the example of FIG. 14, compared with "limitation 1", "limitation 2" inhibits more energy consumption, besides, compared with "limitation 2", "limitation 3" inhibits more energy consumption. In addition, under the condition of no any limitation, the periphery monitoring devices of FIG. 14 all operate.

In the example of FIG. 14, in "limitation 1" of the limiting mode, a monitoring function of the detector (rear) and the radar (rear) for the rear of the own vehicle M is stopped. Besides, in "limitation 2", except for the limiting content in "limitation 1", a monitoring function of the detector (right), the detector (left), the radar (right) and the radar (left) is stopped. Besides, in "limitation 3", except for the limiting content in "limitation 1", a monitoring function of the radar (front) larger than the camera 40 the detector (front) in energy consumption of unit time is also stopped.

In this way, when the functions of the own vehicle M implemented by the automatic driving are limited along with the energy insufficiency, by causing the control over the front condition of the own vehicle M, the safety of the front with a high risk in the driving is ensured. Besides, when the functions of the own vehicle M implemented by automatic driving are limited due to energy insufficiency, the function to be stopped is selected based on the energy of each function in the periphery monitoring device, such that the inhibition of the energy with more efficiency can be realized.

Therefore, under the condition that the functions of the own vehicle M are limited due to the insufficiency of the energy of the own vehicle M, the function limiting part 196 performs the control based on the limiting mode of "limitation 1", after the control is started for prescribed time, under the condition that the energy of the vehicle M is still insufficient, the limiting mode is changed to "limitation 2" to enhance the limitation of the functions related to automatic driving. Further, under the condition that the energy of the own vehicle M is stilled insufficient after the function limiting part 196 changes "limitation 2" for prescribed time, the limiting mode is changed to "limitation 3" to enhance the limitation of the functions related to automatic driving. In this way, by changing the limiting range in stage, proper energy adjustment can be performed.

Besides, under the condition that the insufficiency of the energy residue has been eliminated, the function limiting part 196 can restore the limiting range stage by stage (loosening the limitation), and can also remove the limitation unrelated to the variety of the limiting mode. Therefore, the inhibited energy can be adjusted, for example, the energy (electricity) can be reserved for the future, or the energy management of use up in the destination can be finished.

In addition, when the monitoring function by means of sensing of the automatic driving for one or both of the lateral or rear region of the own vehicle M is stopped due to the stopping of the limitation of the limiting mode, the function limiting part 196 can also forbid the lane change of the automatic driving for the own vehicle M, and can also forbid one or both of forking or converging of the automatic driving for the own vehicle M. Therefore, even though the monitoring of one or both in the or rear region of the own vehicle M is stopped, and the safety of the automatic driving can also be ensured.

In addition, when the lane change, forming or converging of the own vehicle M is stopped along with the implementation of the function limiting part 96 for the function limiting, the action plan generation part 144 regenerates an action plan stored as the action plan information 184 under the condition of not implementing the lane change event, forking event or converging event of the object. In addition, in order to realise the driving of the path to the destination, for a location needing lane change, forming or converging, the limitation to a monitored object range in the periphery monitoring device is removed to implement lane change, forming or converging. That is, the function limiting part 196 stops the monitoring of one or both of the of rear region of the automatic driving for the own vehicle M when the energy of the own vehicle M is insufficient, and momentarily monitors the front side only during lane change, forming or converging of the own vehicle M, and stops the monitoring of the object range again when the lane change, forking or converging is finished. Besides, the action plan generation part 144 can also regenerate the action plan including the lane change, forking or converging therein under the condition that the function limiting of the automatic driving has been removed.

Besides, when the energy of the own vehicle M is insufficient, the function limiting part 196 can also output a control indication to the automatic driving control part 120 to perform the control of switching to manual driving from the automatic driving. Therefore, the energy consumption in the automatic driving is omitted.

In addition, a battery detected by the energy residue calculating part 95 can be connected to an engine of the travel driving force output device 200 as abovementioned, and is charged by using part of output of the engine. For example, the vehicle control system 100 inhibits the consumed energy through the function limiting, therefore, the energy residue is increased by charging of traveling of the own vehicle M, and the insufficiency of the energy may be suppressed. Therefore, the function limiting part 196 removes the function limiting related to vehicle driving of the own vehicle M when the judging result of the energy insufficiency judging part 194 the is that the energy is not insufficient.

Figure 15:
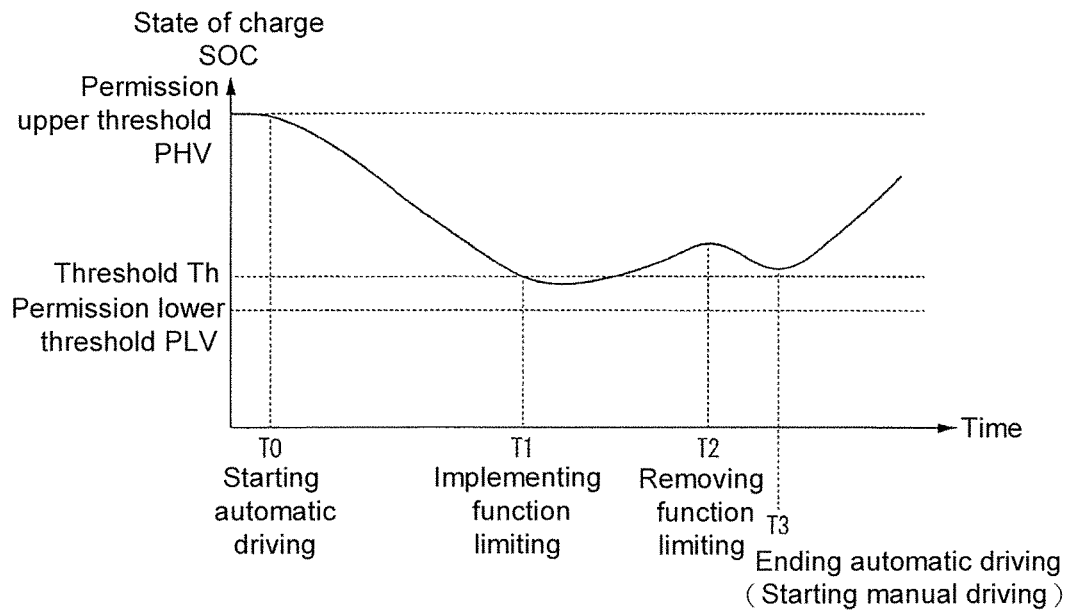
FIG. 15 is a diagram illustrating a relation between function limiting and energy residue in the present embodiment.

FIG. 15 is a diagram illustrating a relation between function limiting and energy residue in the present embodiment. In addition, in the example of FIG. 15, the x axis represents time of traveling of the own vehicle M to the destination, and the y axis represents one example of a state of charge (SOC) as the energy residue. Besides, in FIG. 15, the example of a flow from start to end of the own vehicle M is taken as an example for explanation. The SOC is calculated by the energy residue calculating part 95 every prescribed time and is transmitted to the energy control part 190.

In the example as shown in FIG. 15, for the SOC of the battery, a permission upper threshold PHV and a permission lower threshold PLV are set. The energy control part 190 performs the function limiting related to automatic driving during automatic driving of the own vehicle M to maintain the SOC between the permission upper threshold PHV and the permission lower threshold PLV.

For example, before the start of the automatic driving (before moment T0) as shown in FIG. 15, through manual driving, the use limitation of the HMI 70 is performed as shown in FIG. 12, and control of automatic driving is not performed, therefore, the energy consumed by the own vehicle M in unit time is less. Therefore, the SOC becomes a value close to the permission upper threshold.

When the own vehicle M starts automatic driving at the moment T0, due to the implementation of the functions related to automatic driving (detection of the finder DD, various controls of the automatic driving control part 120, and output of the HMI 70), the consumed energy is reduced. Therefore, the SOC is reduced gradually.

Herein, at moment T1, when the SOC is lower than a threshold Th, the energy insufficiency judging part 194 judges energy insufficiency (for example below the permission lower threshold PLV). The function limiting part 196 implements function limiting based on the judging result.

In addition, as abovementioned, when there are multiple limiting modes, function limiting is started from a mode with small energy inhibition (for example limitation 1 in FIG. 14), if the energy is insufficient for more than prescribed time, then the function limiting related to automatic driving is performed in the limiting mode in which the inhibition is larger than the current limiting mode (for example, limitation 3 in FIG. 14). Besides, in the example of FIG. 15, whether the energy is insufficient is judged by taking the preset threshold as a reference, but is not limited thereto, for example, whether the energy is insufficient can also be judged by comparing the energy predicted to be consumed derived by the energy deriving part 192 to the destination with the SOC.

Besides, when the SOC is risen and exceeds the threshold Th again by the function limiting related to the automatic driving of the own vehicle M, the energy insufficiency judging part 194 judges that the energy insufficiency has been eliminated. The function limiting part 196 removes the function limiting based on the judging result. In addition, the removal of the function limiting can also be performed not after the SOC just exceeds the threshold Th and can be performed after the SOC exceeds the threshold Th for prescribed time. Therefore, frequent switching between the implementation and removal of the function limiting can be avoided.

Besides, in the example of FIG. 15, the automatic driving mode is ended and manual driving is started at time T3, so the SOC is re-increased. The energy control part 190 can properly perform the control related to automatic driving based on the energy of the vehicle through the function limiting processing. Therefore, the proper energy management in the own vehicle M can be realized.

The function limiting part 196 outputs the information related to content of function limiting to the HMI control part 170.

The information providing part 174 in the HMI control part 170 uses the navigation device 50, the display device 82, the speaker 82 and the like of the HMI 70 to inform the vehicle passenger of the own vehicle M of prescribed information when implementing the function limiting of the own vehicle M through the function limiting part 196. The so-called prescribed information for example refers to information representing energy insufficiency or information related to implemented content of function limiting, information representing that the function limiting has been removed (restored to an original monitored object range), etc.

[Screen Examples]

Next, for the informing example that the vehicle passenger is informed by the information providing part 174 is explained with a drawing. In addition, in the following explanation, the example that the vehicle passenger of the own vehicle M is informed by a screen display device 82 is explained, but is not limited thereto, for example, the vehicle passenger can also be informed by a screen display of the navigation device 50 of sound output of the speaker 83.

Figure 16:
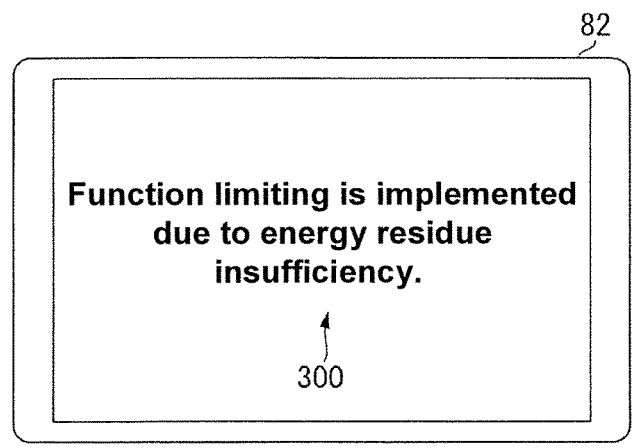
FIG. 16 is a diagram illustrating a picture example informed when function limiting is implemented.

FIG. 16 is a diagram illustrating a screen example informed when function limiting is implemented. The energy control part 190 performs the function limiting of the own vehicle M under the prescribed mode when the energy insufficiency judging part judges the energy insufficiency, and outputs information with an intention limiting the functions related to automatic driving to the HMI control part 170.

When the HMI control part 170 inputs the information representing that the functions related to automatic driving are limited by the energy control part 190, corresponding message information 300 for informing is output to the display device 82. In the example of FIG. 16, as the message information 300, "the function limiting has been implemented due to insufficient energy residue" is displayed on the screen. In addition, for example, information having the content of the implemented limiting mode or regenerated information representing that the action plan is performed due to function limiting, information urging the vehicle passenger to pull off at an energy supply facility to implement energy supply and the like can serve as the message information 300. In addition, the so-called energy supply facility for example is a facility which can used for replenishing the energy for driving a power source of the own vehicle M or the energy causing each function related to automatic driving to transfer to the destination without limitation, such as a fuel station or charging station.

Figure 17:
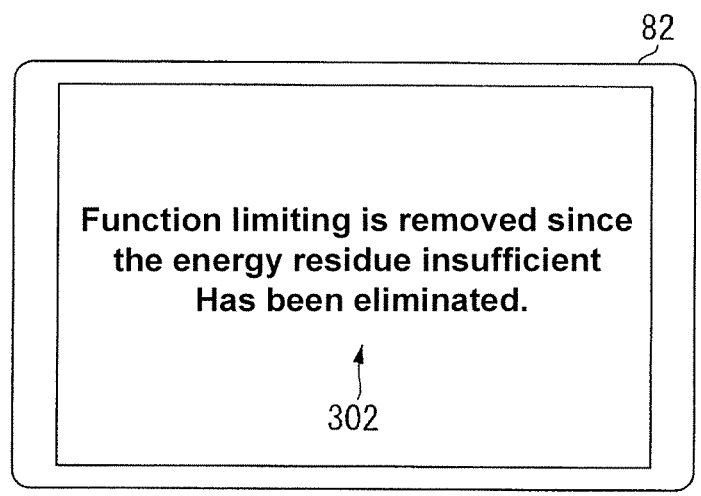
FIG. 17 is a diagram illustrating a picture example informed when function limiting is removed.

Besides, under the condition that the function limiting in the present embodiment is removed or loosened, the HMI control part 170 informs the vehicle passenger of the invention through the display device 82. FIG. 17 is a diagram illustrating a screen example informed when function limiting is removed. The energy control part 190 removes the function limiting of the own vehicle M when the judging that the energy is insufficient through the energy insufficiency judging, and outputs the information of removing the intention of removing the function limiting related to automatic driving to the HMI control 170.

The HMI control part 170 outputs corresponding message information 302 for informing to the display device 82 when inputting the information representing that the energy control part 190 removes the function limiting related to automatic driving. In the example of FIG. 17, as the message information 302, "the function limiting is removed since the energy insufficiency has been eliminated" is displayed on a picture of the display device 82. In addition, the message information 300, for example, can be information having the content of the implemented limiting mode or regenerated information representing that the action plan is performed due to function limiting and the like but is not limited thereto. By informing through using the picture and the like, the vehicle passenger can master the control content in the own vehicle M and can obtain a relief of automatic driving.

[Processing Flow]

Figure 18:
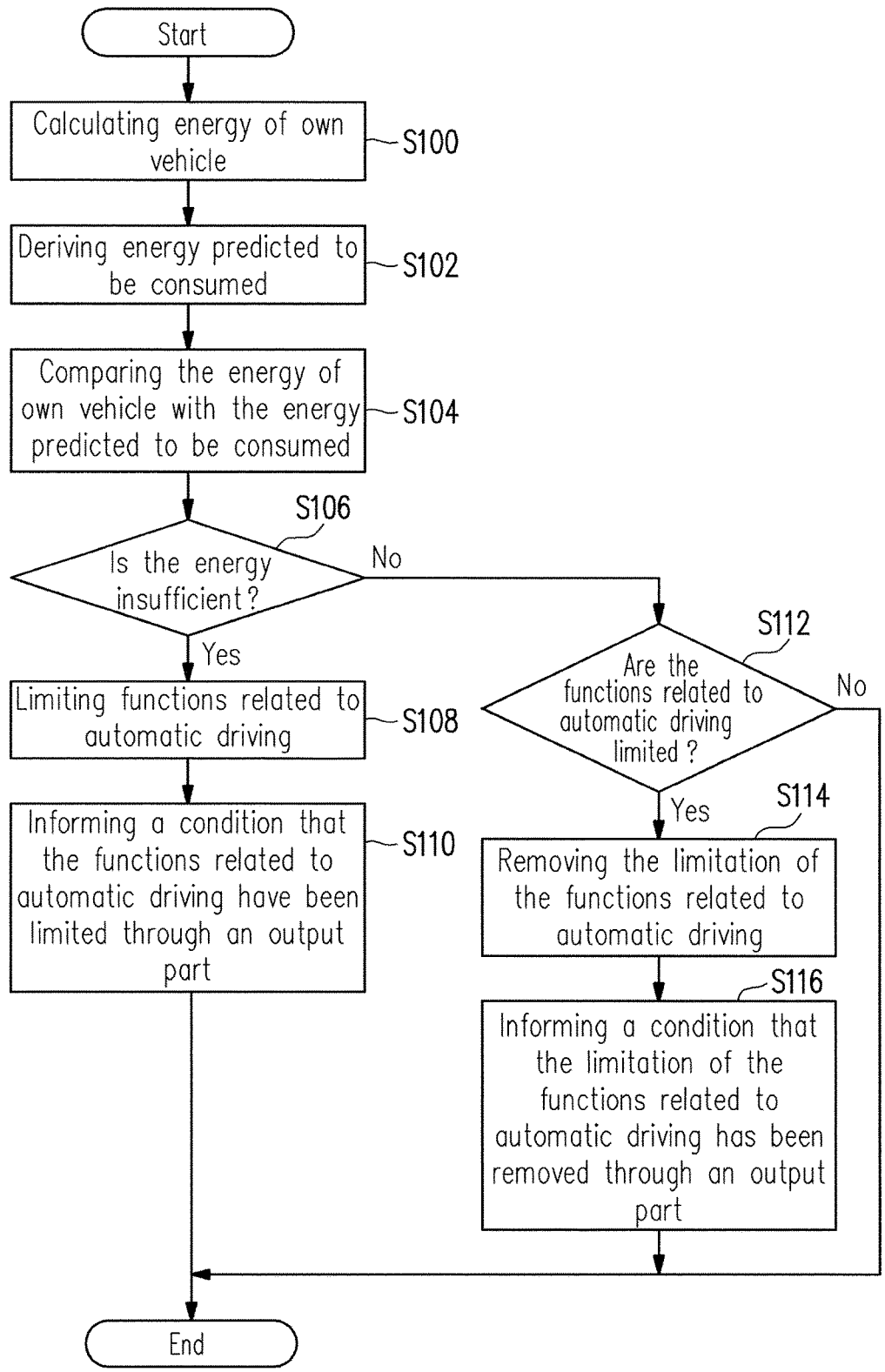
FIG. 18 is flow chart of one example of function limiting processing.

FIG. 18 is flow chart of one example of function limiting processing. In the example of FIG. 18, the energy control part 190 obtains the energy (residue) of the own vehicle M calculated by the energy residue calculating part 95 (step S100). Besides, the energy deriving part 192 derives the energy predicted to be consumed (step S102).

Next, the energy insufficiency judging part 194 compares the energy of the own vehicle M obtained in the process in S100 with the energy predicted to be consumed in processing of S102. In addition, in the processing of S104, the energy is compared with the energy predicted to be consumed, but for example, the current energy of the own vehicle M can be compared with a preset threshold. When compared with the threshold, the deriving of the energy predicted to be consumed may not be performed.

The energy insufficiency judging part 194 judges energy insufficiency in a comparing result between the energy of the own vehicle M and the energy predicted to be consumed (step S106). For example, when the consumed energy to the destination obtained according to the energy of the own vehicle M is less than the energy predicted to be consumed, the energy insufficiency judging part 194 judges energy insufficiency. In addition, the energy insufficiency judging part 194 can also judges the energy insufficiency when the energy residue of the own vehicle M does not meet the preset threshold.

When the energy is insufficient, the function limiting part 196 limits the functions related to automatic driving of the own vehicle M (step S108). In addition, under the condition that multiple limiting modes are set, the function control can be performed from the mode with small energy inhibition, if the energy insufficiency lasts for more than prescribed time, then the limiting mode with the inhibition more than the current limiting mode is used for performing the function limiting related to automatic driving.

Next, the function limiting part 196 outputs information representing that the functions related to automatic driving have been limited to the HMI control part 170 and informs the vehicle passenger by the output part (for example at least one of the navigation device 50, the display device 82 and the speaker 83) by means of the HMI control part 170 (step S110), and the processing in this flow is ended. In addition, if in the processing of S110, the content that the functions related to automatic driving have been limited is output through the output part, then the processing in S110 is omitted, and when the informed content is changed, informing can be performed by the output part.

Besides, when the energy is not insufficient, the function limiting part 196 judges whether the own vehicle M limits the function relates to automatic driving (step S112). If the functions related to automatic driving are limited, then the function limiting part 196 removes the function limiting related to automatic driving (step S114). Next, the function limiting part 196 outputs the information representing that the function limiting related to automatic driving has been removed to the HMI control part 170 and informs the vehicle passenger by the output part through the HMI control part 170 (step S116), and the processing in this flow chart is ended. Besides, in the processing of S112, if the functions related to automatic driving are not limited, then the processing in this flow chart is finished directly. In addition, the processing in FIG. 18 for example is repeatedly executed at prescribed time interval during the period of executing the automatic driving or from the accepting of the processed start indication to the ending of the processing.

In addition, in the embodiment, as one example related to automatic driving, the functions of the finder DD are mainly explained, but not limited thereto, for example, the function limiting related to input/output specific to the non-driving operation of the HMI 70 can be performed, and the limitation of their combination can also be performed. The function limiting specific to the non-driving operation system of the HMI 70, for example, can be stopping of the air conditioner 93 or disabling of the content playing device 85, etc., but is not limited thereto.

According to the embodiments mentioned above, when the energy of the vehicle is insufficient due to the automatic driving of at least one of velocity control and steering control of the automatic vehicle, by limiting the functions related to automatic driving, the control over the automatic driving of the vehicle to the destination can be performed properly.

The above uses the embodiments to explain a form of implementing the present invention, but the present invention is not limited to the present embodiment in any form, and can be subjected to various transformations and substitutions in a range of not departing from the principle of the present invention.

What is claimed is:

1. A vehicle control system, comprising
   an automatic driving control part, performing automatic driving of at least one of velocity control and steering control of a vehicle, and
   a function limiting part, limiting functions related to the automatic driving when energy of the vehicle is insufficient due to the automatic driving,
   wherein, when the energy of the vehicle is insufficient, the function limiting part limits a monitored object range of a periphery monitoring device used by the automatic driving, and forbids the automatic driving from performing at least one of a lane changing maneuver by the vehicle, a traveling maneuver onto a road fork by the vehicle, and a lane merging maneuver by the vehicle.

2. The vehicle control system according to claim 1, wherein
   the function limiting part limits the functions related to the automatic driving specific to each control direction viewed from the vehicle in the automatic driving.

3. The vehicle control system according to claim 2, wherein
   the function limiting part causes a control based on a front side condition of the vehicle to be on priority while limiting the functions related to the automatic driving when energy the of the vehicle is insufficient.

4. The vehicle control system according to claim 2, wherein
   the function limiting part stops each function related to the automatic driving based on an energy required for each function related to the automatic driving.

5. The vehicle control system according to claim 2, further comprising
   an energy deriving part, deriving the energy predicted to be consumed based on an action plan or path condition in a traveling path when the vehicle drives on the traveling path from a current position of the vehicle to a destination, and
   the function limiting part limits the functions related to the automatic driving based on the energy to be consumed derived by the energy deriving part.

6. The vehicle control system according to claim 1, wherein
   the function limiting part causes a control based on a front side condition of the vehicle to be on priority while limiting the functions related to the automatic driving when the energy of the vehicle is insufficient.

7. The vehicle control system according to claim 1, wherein
   the function limiting part stops each function related to the automatic driving based on an energy required for each function related to the automatic driving.

8. The vehicle control system according to claim further comprising
   an energy deriving part, deriving the energy predicted to be consumed based on an action plan or path condition in a traveling path when the vehicle drives on the traveling path from a current position of the vehicle to a destination, and
   the function limiting part limits the functions related to the automatic driving based on the energy to be consumed derived by the energy deriving part.

9. A vehicle control method, by which a computer:
   performs automatic driving of at least one of velocity control and steering control of an automatic vehicle, and
   limits functions related to the automatic driving when energy of the automatic vehicle is insufficient due to the automatic driving,
   wherein, when the energy of the automatic vehicle is insufficient, the computing limits a monitored object range of a periphery monitoring device used by the automatic driving, and forbids the automatic driving from performing at least one of a lane changing maneuver by the automatic vehicle, a traveling maneuver onto a road fork by the automatic vehicle, and a lane merging maneuver by the automatic vehicle.

10. A non-transitory computer readable medium storing a vehicle control program that when executed by a computer, cause the computer to:
    perform automatic driving of at least one of velocity control and steering control of an automatic vehicle, and
    limit functions related to the automatic driving when energy of the automatic vehicle is insufficient due to the automatic driving,
    wherein, when the energy of the automatic vehicle is insufficient, the computer is caused to limit a monitored object range of a periphery monitoring device used by the automatic driving, and to forbid the automatic driving from performing at least one of a lane changing maneuver by the automatic vehicle, a traveling maneuver onto a road fork by the automatic vehicle, and a lane merging maneuver by the automatic vehicle.

* * * * *